Jan. 14, 1930.                    J. SLEPIAN                    1,744,014

POLARIZATION CELL CONDENSER

Filed Sept. 12, 1925

WITNESSES:

INVENTOR
Joseph Slepian
BY
ATTORNEY

Patented Jan. 14, 1930

1,744,014

UNITED STATES PATENT OFFICE

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA

POLARIZATION-CELL CONDENSER

Application filed September 12, 1925. Serial No. 55,895.

My invention relates to electrolytic devices and it has particular relation to polarization cells adapted to be used as electrical condensers in general, and particularly adapted for use in filter circuits which are employed in connection with commutated-current sources for taking the place of A batteries in radio-detector apparatus.

I have found that it is practically impossible to eliminate the hum in radio-detector apparatus utilizing a rectified or commutated current in lieu of an A battery and utilizing filter circuits comprising condensers of any of the types heretofore employed. By reason of the very small voltage, usually not over 6 volts, an enormous condenser capacity is required, which would necessitate the utilization of some 10,000 large radio condensers of the mica type in parallel, in order to render effective service. With electrolytic condensers of the film-forming type, larger capacities are readily obtainable than with the mica condensers, but success has not been achieved with film-forming condensers, due either to the high series resistance thereof, or possibly to the relatively low capacity of the condenser during certain portions of the cycle.

I have found that the foregoing difficulties are readily avoided by means of a polarization-cell condenser which can be constructed in a compact unit of less than ten cubic inches volume. Although I am not at present prepared to state all of the reasons for the successful operation of this cell in low voltage filter circuits, I am aware that the capacity effect is enormous, of the order of $10^4$ mf., and that the series resistance is small by reason of the extremely thin films of electrolyte which I employ.

Figure 1:
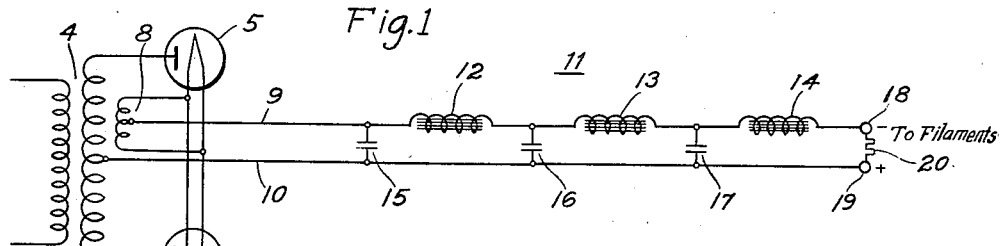

My invention will best be understood by reference to the accompanying drawings, wherein Figure 1 is a diagrammatic view of circuits and apparatus showing my invention in an A battery substitute utilizing an alternating-current source and two rectifiers.

Figure 2:
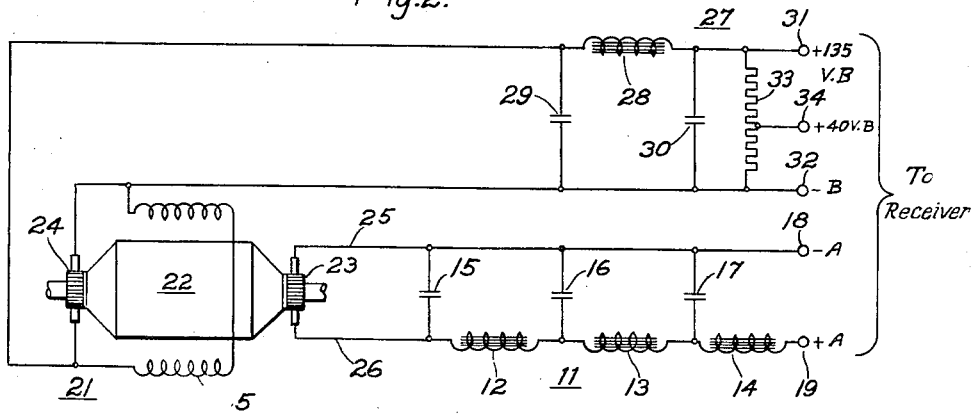
Figure 3:
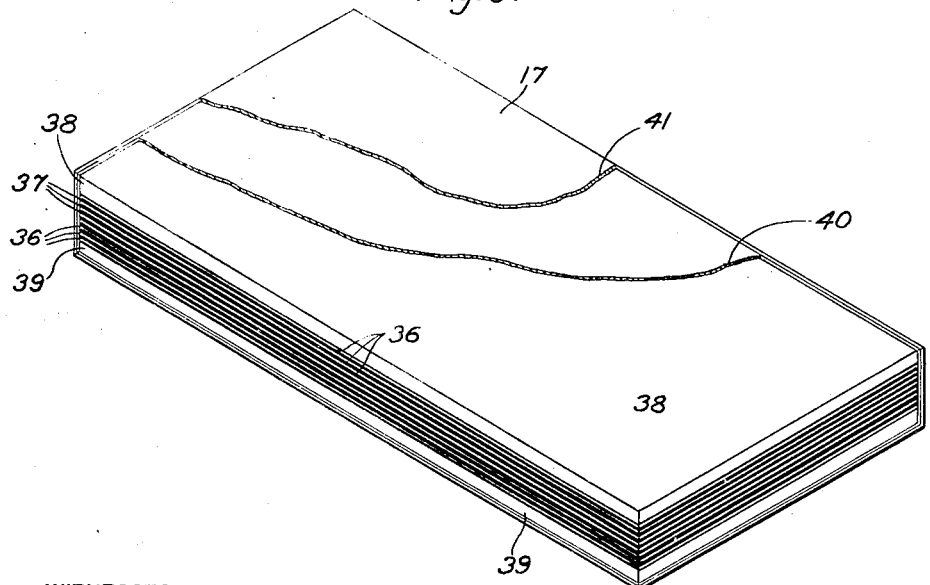

Fig. 2 is a similar view showing a double-current generator with filter circuits for energizing both the A and the B battery circuits of a radio receiver, and Fig. 3 is an isometric perspective view showing a complete condenser unit made in accordance with my invention.

In Fig. 1 is shown an A battery substitute wherein alternating current is supplied to a step-down transformer 4 and rectified by means of two hot-cathode rectifiers 5 and 6, which are connected in a usual way to the secondary winding 7 of the transformer, the filaments or hot cathodes of the rectifiers being energized from a small tertiary winding 8 on the transformer. The rectified current is led through two conductors 9 and 10 to a filter circuit, designated in its entirety by the numeral 11, and comprising a plurality of serially connected inductance devices 12, 13 and 14, and a plurality of condenser units 15, 16 and 17 connected across the circuit between the several inductors.

The inductance devices are of the iron-core type, as is usual in such circuits, air gaps being provided in the cores to prevent saturation. The filtered current is delivered to two terminals 18 and 19 which are adapted to be connected to the A battery leads of a radio receiving set. If desired, a ballast resistor 20 may be connected in shunt across the terminals 18 and 19 for improving the regulation.

In Fig. 2 is shown the generator of a small motor-generator set for taking the place of both the A battery and the B battery of a radio receiver set. The generator 21 comprises an armature 22 carrying two windings which are severally connected to two commutators 23 and 24 for supplying direct currents at different voltages. The low-voltage commutator 23 is connected to two leads 25 and 26 which are connected to the negative and the positive A battery terminals 18 and 19 through the filter circuit 11, as described in connection with Fig. 1. In this case, however, the ballast resistor 20 is not needed for improving the regulation.

The B battery circuits are supplied from the commutator 24 through a filter circuit 27 which may comprise a single serially-connected inductor 28 and two shunt-connected condensers 29 and 30 one on either side thereof. The leads are connected to two terminal binding posts 31 and 32, across which may be shunted a non-inductive resistor 33 from which is tapped another circuit which is connected to a binding post 34 for supplying an intermediate voltage for the detector tube of the receiver set.

The generator 21, just described, is provided with a field winding 35 which is shown as being connected across the high-voltage side of the machine.

The condensers 29 and 30 of the filter circuit for the B battery terminals are of relatively low capacity, about five microfarads, and may be either of the polarization-cell type or of any other desired type.

The condensers 15, 16 and 17 of the filter circuit associated with the A battery terminals, are of my improved polarization-cell construction. One of the condenser units 17 is shown in Fig. 3. The unit comprises a plurality of electrode plates 36 which are separated by thin porous insulating sheets 37 which are impregnated with a suitable electrolyte. In a preferred construction, the plates 36 are 37-mil, pure iron sheets about six inches long and two or two and one-half inches wide, although thinner stock may be used. The insulating sheets 37 are of filter paper of 12 mils thickness. The filter papers are impregnated with a saturated aqueous solution of sodium hydroxide to which is added 30%, by volume, of glycerine or other substance suitable for reducing the vapor pressure and hence the evaporation. The solution is utilized in a saturated state, as a practical means for still further reducing the vapor pressure and evaporation.

While I have described an iron-alkali cell as a preferred form, it will be understood that I am not altogether limited to the ingredients mentioned. It is essential, however, that the electrodes shall be of some material which will not corrode in the electrolyte that is used. Very successful results have also been obtained with carbon plates separated by blotting paper saturated with a calcium chloride solution. Instead of utilizing carbon plates, thin hardened coatings of aquadag or other carbonaceous paste could be prepared to decrease the weight and bulk of the electrodes.

The use of the dry-battery type of construction just described has two important advantages, both of which contribute very materially to the phenomenal success achieved with filters using my new cells. First, by reason of the fact that the electrolyte is held in thin sheets of porous material, the spacing between the plates may be made very small, thus materially decreasing the series ohmic resistance which is a very serious limitation on the effectiveness of filter-circuit condensers. Secondly, by the use of porous sheets carrying the electrolyte, I am able to dispense with the use of a separate containing vessel for holding the electrolyte of each cell, and I am enabled to stack up a plurality of cells in a single unit and without separate containing vessels therefor. Preferably, the unit is bound up, between two rigid plates 38 and 39, by means of a suitable wrapping 40 which is, in turn, preferably surrounded by a substantially hermetically tight wrapping 41 of glassine paper or other suitable material.

My polarization-cell condensers must be operated at a voltage less than that necessary to decompose the electrolyte or liberate gas. Practically, it is necessary to operate substantially below that voltage, because the leakage current increases very materially as the decomposition limit is reached. I have found, as a practical guide, that the polarization unit operates satisfactory as long as it remains cool. In the iron-alkali cell hereinabove described, I operate at voltages of from .5 to 1.1 peak volts per unit, six units being stacked in series, for example, for a six-volt circuit.

The capacities obtained with polarization cells of the above construction are enormous. Experiments indicate that the capacity is nearly 400 microfarads per square centimeter, or of the order $10^4$ mf. for the unit hereinabove described. When it is realized that these enormous capacities are obtained in a device of small volume, containing no acid and no liquid, and having a very low series ohmic resistance, it will be evident that I have succeeded in my object of providing a reliable, inexpensive condenser adapted for use in connection with A battery substitutes.

I claim as my invention:

1. An electrolytic polarization condenser of the dry-battery type comprising a stack of pure iron plates alternating with sheets of porous insulating material, said insulating material holding an electrolyte within its pores, said plates being non-corrodible in said electrolyte, said electrolyte being a substantially saturated alkaline solution.

2. An electrolytic polarization condenser of the dry-battery type comprising a stack of pure iron plates alternating with sheets of porous insulating material, said insulating material holding an electrolyte within its pores, said plates being non-corrodible in said electrolyte, said electrolyte being a substantially saturated alkaline solution with an additional substance to retard evaporation and a substantially hermetic envelope enclosing the entire stack of plates and sheets.

3. An electrolytic polarization condenser comprising a stack of pure-iron plates alternating with sheets of porous insulating material, said sheets holding a saturated aqueous solution of sodium hydroxide within their pores, and a material incorporated into said aqueous solution to reduce the vapor pressure thereof.

4. An electrolytic polarization condenser comprising a plurality of pure-iron plates intercalated with sheets of porous material, and an electrolyte comprising an alkaline material and a hygroscopic material, having properties similar to those of glycerine, saturating said sheets.

In testimony whereof, I have hereunto subscribed my name this 20th day of August, 1925.

JOSEPH SLEPIAN.